United States Patent [19]

Nagai

[11] 4,349,855

[45] Sep. 14, 1982

[54] LIGHTNING ARRESTER

[75] Inventor: Nobuo Nagai, Amagasaki, Japan

[73] Assignee: Mitsubishi Denki Kabushiki Kaisha, Tokyo, Japan

[21] Appl. No.: 238,074

[22] Filed: Feb. 25, 1981

Related U.S. Application Data

[63] Continuation of Ser. No. 21,173, Mar. 16, 1979, abandoned.

[51] Int. Cl.³ .................................... H02H 9/04

[52] U.S. Cl. .................................... 361/127; 174/139; 174/2; 338/230; 338/275; 313/231.11; 29/592 R; 29/849; 29/851; 29/613

[58] Field of Search ............... 361/127, 126, 128, 117, 361/132, 130, 131, 120; 338/21, 20, 230, 275; 315/36; 313/324, 325, 231.1; 174/2, 139; 29/592 R, 851, 849, 631, 613, 614

[56] References Cited

U.S. PATENT DOCUMENTS

| | | | |
|---|---|---|---|
| 2,305,577 | 12/1942 | Stoelting | 361/127 X |
| 2,501,322 | 3/1950 | Ferguson et al. | 361/127 X |
| 3,214,634 | 10/1965 | Osmundsen et al. | 361/127 X |
| 3,806,765 | 4/1974 | Matsuoka et al. | 338/21 X |
| 3,872,582 | 3/1975 | Matsuoka et al. | 338/20 X |
| 4,045,604 | 8/1977 | Clabburn | 29/631 X |

*Primary Examiner*—Patrick R. Salce

*Attorney, Agent, or Firm*—Oblon, Fisher, Spivak, McClelland & Maier

[57] ABSTRACT

A lightning arrester comprises a non-linear resistor as a lightning arrester element and an insulator holding the non-linear resistor in one body without a gap to prevent deterioration of the non-linear resistor caused by moisture.

3 Claims, 1 Drawing Figure

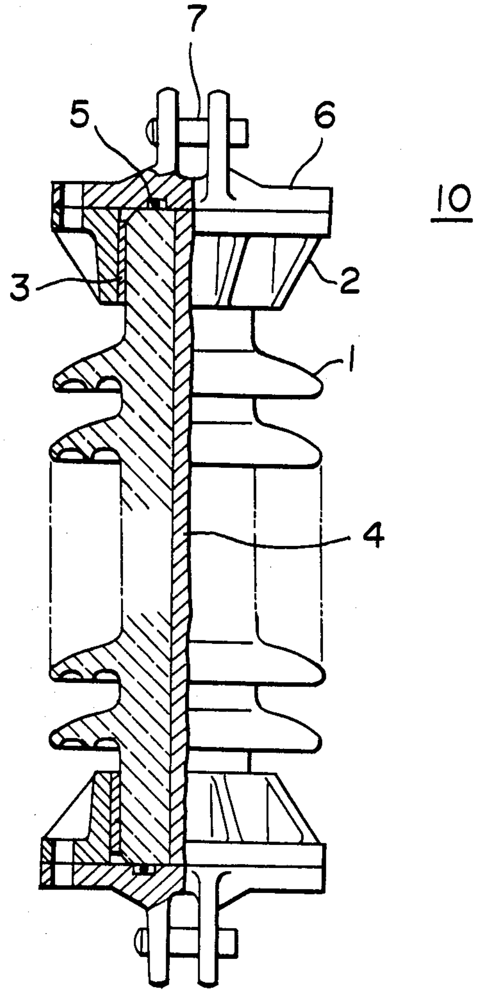
7
5
6
10
3
2
1
4

LIGHTNING ARRESTER

This is a continuation of application Ser. No. 21,173, filed Mar. 16, 1979, now abandoned.

BACKGROUND OF THE INVENTION

The present invention relates to a lightning arrester used for protection of transmission-distribution equipment subject to abnormal voltage.

Resistors having excellent non-linear resistive characteristic could be obtained by granulating a mixture of zinc oxide ZnO as a main component and small amounts of additive such as $Bi_2O_3$, $Co_2O_4$, $Sb_2O_3$, $MnO_2$ and $CrO_3$, molding it and sintering it at about 1300° C.

A non-dynamic current type lightning arrester can be formed by using said non-linear resistor as an element for lightning arrester since its resistance is infinite in the normal operation voltage.

Such lightning arrester need not have a serial gap whereby length of the lightning arrester can be shortened to less than $\frac{2}{3}$ in comparison with a valve resistance arrester having serial gap and a compact structure of the lightning arrester can be given.

Such lightning arresters are disclosed in U.S. Pat. No. 3,806,765. As shown in U.S. Pat. No. 3,806,765, the non-linear resistor made of a main component of zinc oxide, is used by holding in an insulator. When a gap is formed between the non-linear resistor and an insulator, water is immersed into the insulator from outside and the non-linear resistor may be in wetting fault whereby satisfactory characteristic as the lightning arrester is lost. Therefore, a water sealing structure such as double O-ring packings is required between the insulator and terminals formed at both ends and the structure is complicated and quality control in a mass production is difficult.

SUMMARY OF THE INVENTION

It is an object of the present invention to provide an economical lightning arrester which has simple sealings structure and which can be produced in an improved productivity by forming the insulator and the non-linear resistor in one body without a gap.

It is another object of the present invention to provide an economical lightning arrester which can be produced under high quality control in a mass production by forming the insulator and the non-linear resistor having a main component of zinc oxide in one body by sintering them without deteriorating the electric characteristics of the non-linear resistor.

BRIEF DESCRIPTION OF THE DRAWINGS

FIG. 1 is a partially sectional side view of one embodiment of the lightning arrester of the present invention.

DESCRIPTION OF THE PREFERRED EMBODIMENT

In FIG. 1, a lightning arrester (10) has a structure comprising a non-linear resistor (4) produced by sintering a composition having a main component of zinc oxide as a lightning arrester element which is held in an insulator (1) made of porcelain. Therfore, the lightning arrester (10) can be used as a supporting insulator. Each flange (2) is bonded at both ends of the insulator (1) with cement (3). Moreover, each metal cover (6) which is electrically connected to the non-linear resistor (4) is bonded at both ends of the insulator (1). The metal covers (6) are used as terminals of the lightning arrester. O-ring packing (5) for sealing is disposed between the insulator (1) and the metal cover, however, it is possible to eliminate the O-ring packing in the present invention since the lightning arrester has the structure for preventing wetting of the non-linear resistor (4) as described below. A fitting bolt (7) for fitting the lightning arrester on a steel tower or a power transmission line, is mounted on the metal cover (6).

In such structure of the present invention, the porcelain insulator (1) and the non-linear resistor (4) are formed in one body without a gap. The formation of one body of the porcelain insulator (1) and the non-linear resistor (4) can be attained by adjusting contraction coefficients of the porcelain insulator (1) and the non-linear resistor (4) caused by sintering. Thus, in order to give the non-linear resistive characteristic of the non-linear resistor (4), it is necessary to sinter in specific sintering pattern whereby it is not easy to prepare a lightning arrester which has both of satisfactory results of one-body formation and electric characteristics of the non-linear resistor (4).

In accordance with the present invention, a cylindrical zinc oxide type non-linear resistor (4) is prepared by sintering it at about 1300° C. The non-linear resistor has satisfactory electrical characteristics as a lightning arrester such as desired non-linear resistive characteristics and spark current endurance. In accordance with experiments, it has been confirmed that the electric characteristics are not changed and a contraction in shape is not further caused by heating the sintered non-linear resistor at lower than 1200° C.

On the other hand, a low temperature sintered porcelain is usually sintered at 1160° to 1200° C. In the present invention, such lower temperature sintered porcelain is used as the porcelain insulator (1). Therefore, the composition for the non-linear resistor (4) and the composition for the insulator (1) are combined and sintered at 1160° to 1200° C. so as to form the contracted porcelain insulator (1) and the contracted non-linear resistor in one body in adjustment of the contraction coefficients. In the adjustment, only contraction coefficient of the porcelain composition can be considered and no technological difficulty is caused.

The insulator (1) and the non-linear resistor (4) can be formed in one body by said adjustment. The device for the supporting insulator and the lightning arrester can be obtained by sintering them to form one body of the zinc oxide type non-linear resistor (4) as the lightning arrester element and the porcelain insulator (1).

The insulator (1) and the non-linear resistor (4) are formed in one body whereby an insulating layer is formed on the surface of the non-linear resistor (4) by the porcelain insulator (1).

Even though the O-ring packing (5) for the air-tightening structure is deteriorated, moisture is not immersed between the insulator (1) and the non-linear resistor (4) because of no gap and no wetting fault is caused.

When the device having the structure of FIG. 1 is used as a supporting insulator for a power transmission line instead of long trunk insulator, it is a self-protective type lightning arrester insulator containing an arrester to prevent trouble on withstanding in a power transmission system. When it is used in a substation, it is advantageously effective for both of a lightning arrester and busbar supporting.

In accordance with the present invention, it is enough to maintain the sintering pattern of the low temperature sintered porcelain and to adjust the contraction coefficeint of the insulator (1), in the sintering step for forming one body of the insulator (1) and the zinc oxide type non-linear resistor (4). Moreover, electric characteristics of the non-linear resistor (4) are advantageously not changed in the sintering step. As the result, the defect in the sintering step for forming one body is remarkably decreased to give more than 90% of non-defect products whereby an economical device is obtained in comparison with the conventional device.

The low temperature sintered porcelain used as the insulator (1) in the present invention is usually used as an insulating material in a relatively lower voltage system.

From the viewpoint, the lightning arrester device of the present invention is especially effective as an insulator having lightning arrester effect which is used in a distribution system.

What is claimed is:

1. A lightning arrester including a sintered non-linear resistor and an insulator formed into a unitary body, comprising:

a non-linear resistor composed of a composition having zinc-oxide as a main component and sintered at approximately 1300° C.; and an insulator having a predetermined inner volume and substantially surrounding said non-linear resistor, said insulator composed of a sintered porcelain covering said non-linear resistor and sintered at approximately 1160° C. to 1200° C., said sintering causing a contraction of said porcelain only, which eliminates any gap between said insulator and said non-linear resistor thereof, whereby only the contraction of said insulator during the sintering thereof need be adjusted for in determining said perdetermined inner volume.

2. A lightning arrester according to claim 1 wherein terminals for said non-linear resistor are formed on both ends of said insulator.

3. A method of producing a lightning arrestor including a sintered non-linear resistor and an insulator formed into a unitary body, said method comprising:

sintering a non-linear resistor at approximately 1300° C., said non-linear resistor having zinc-oxide as a main component;

covering said sintered non-linear resistor with a porcelain insulator; and sintering said insulator at approximately 1160° C. to 1200° C., whereby only said insulator contracts and eliminates any gap between said insulator and said non-linear resistor.

* * * * *

UNITED STATES PATENT AND TRADEMARK OFFICE

CERTIFICATE OF CORRECTION

PATENT NO. : 4,349,855

DATED : September 14, 1982

INVENTOR(S) : Nobuo Nagai

It is certified that error appears in the above-identified patent and that said Letters Patent is hereby corrected as shown below:

On the title page insert Foreign Application Priority Data:

[30] -- Foreign Application Priority Data

March 18, 1978 [JP] Japan......35198/78 --

Signed and Sealed this

*Sixteenth* Day of *November 1982*

[SEAL]

*Attest:*

GERALD J. MOSSINGHOFF

*Attesting Officer* *Commissioner of Patents and Trademarks*